United States Patent
Calderon et al.

[11] Patent Number: 5,177,497
[45] Date of Patent: Jan. 5, 1993

[54] COMPLETED PLOT ROLLING MECHANISM FOR A PLOTTER

[75] Inventors: Jose L. Calderon, Arleta; Patrick Nguyen, Walnut; John M. Bertalan, Tustin, all of Calif.

[73] Assignee: Calcomp Inc., Buena Park, Calif.

[21] Appl. No.: 686,761

[22] Filed: Apr. 17, 1991

[51] Int. Cl.⁵ .................. G01D 15/28; B65H 29/00
[52] U.S. Cl. .................. 346/1.1; 346/134; 346/139 R; 271/184; 271/187
[58] Field of Search .......... 346/134, 139 R; 271/184–187; 355/321

[56] References Cited

U.S. PATENT DOCUMENTS

| | | | |
|---|---|---|---|
| 4,646,109 | 2/1987 | Toyama et al. | 346/134 |
| 5,037,082 | 8/1991 | Roller | 271/187 |

Primary Examiner—Benjamin R. Fuller
Assistant Examiner—Gerald E. Preston
Attorney, Agent, or Firm—Donald A. Streck; Wm. F. Porter, Jr.

[57] ABSTRACT

This is an apparatus and associated method for rolling large pieces of a flexible media such as completed plots produced by a plotting pen plotter. The rolling mechanism is placed adjacent an exit of the pen plotter to received ejected media pieces therein. Upon detecting the leading edge of a media piece while in an open position, the mechanism closes to form a guide slot to a cylindrical rolling chamber. The media piece is then urged along the guide slot and into the rolling chamber where it is rolled by a drive roller. Upon detecting the trailing edge of the media piece, the mechanism opens allowing the rolled media piece to fall into a receiving bin. The stationary portion and the rotating portion are formed of a plurality of slats having low contact area edges disposed for media pieces to move along whereby the media pieces move along a low friction path.

19 Claims, 3 Drawing Sheets

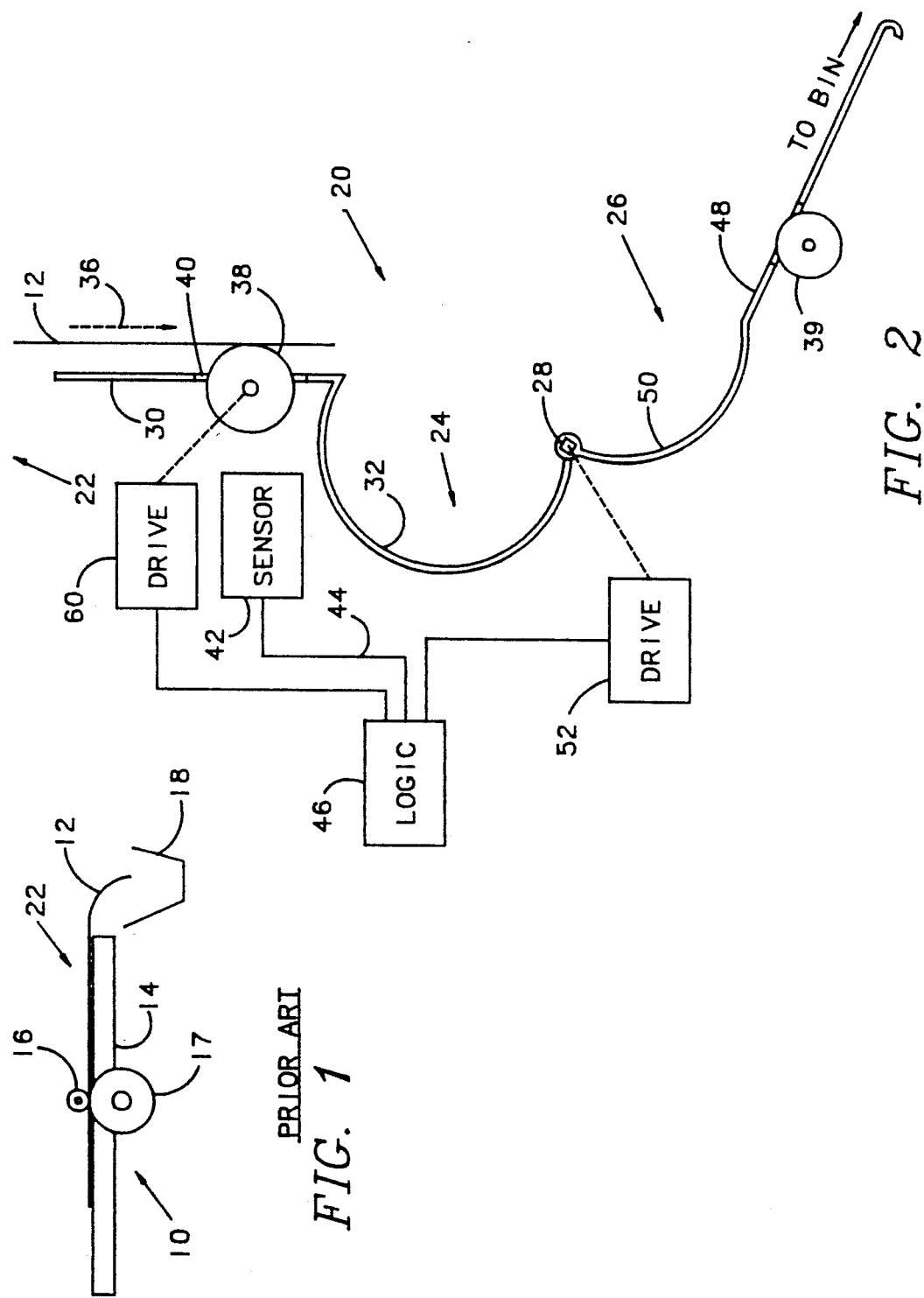

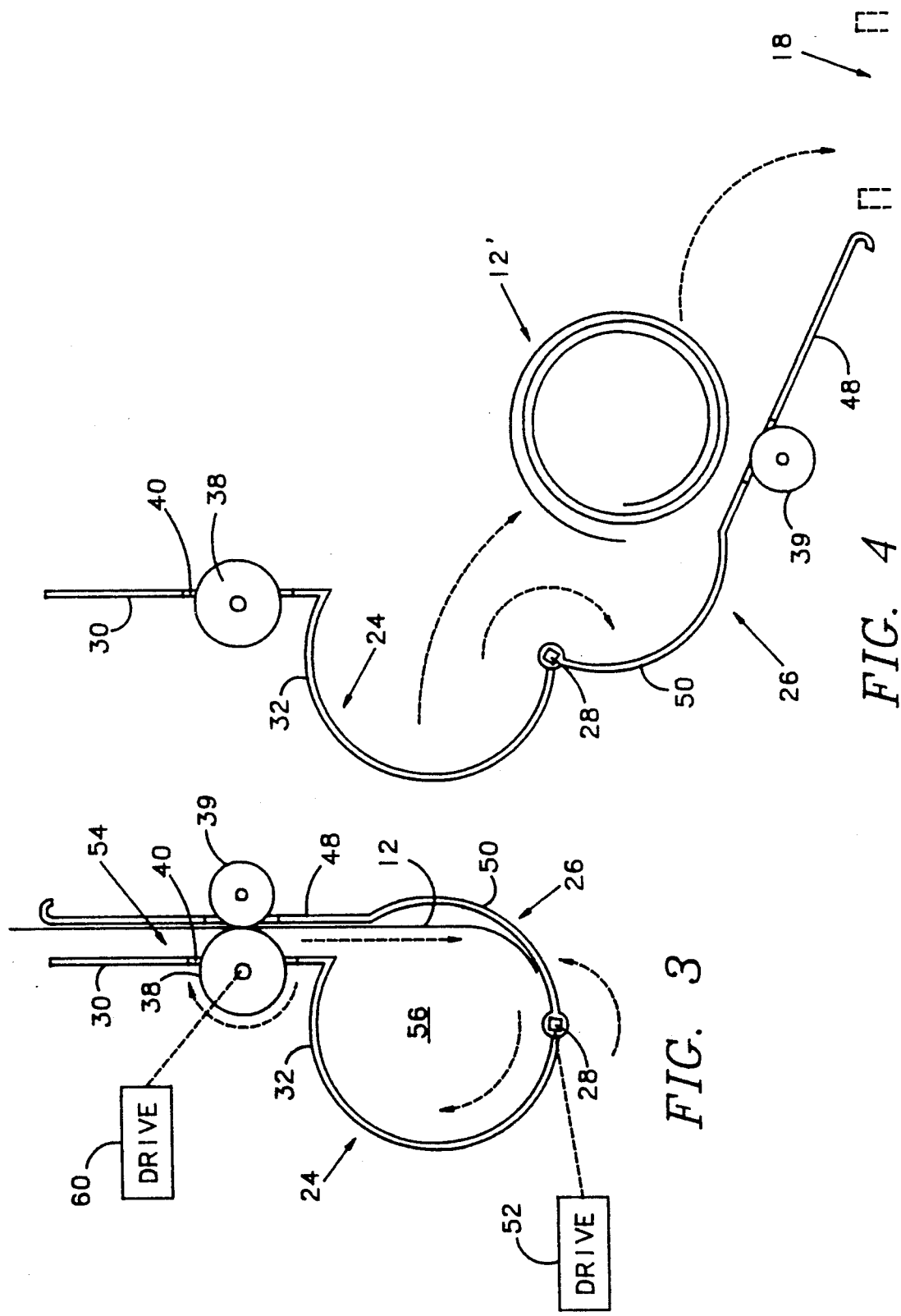

COMPLETED PLOT ROLLING MECHANISM FOR A PLOTTER

BACKGROUND OF THE INVENTION

This invention relates to pen plotting devices driven by computers, and the like, and, more particularly, to an apparatus and associated method for rolling large pieces of a flexible media such as completed plots produced by a pen plotter. The rolling mechanism is placed adjacent an exit of the device to received ejected media pieces therein. Upon detecting the leading edge of a media piece while in an open position, the mechanism closes to form a guide slot to a cylindrical rolling chamber. The media piece is then urged along the guide slot and into the rolling chamber where it is rolled by a drive roller. Upon detecting the trailing edge of the media piece, the mechanism opens allowing the rolled media piece to fall into a receiving bin.

Pen plotters are popular so-called peripheral devices for use with computers, particularly in conjunction with applications programs such as CAD/CAM. They have an advantage over other forms of plotting of being simple in operation and construction and, therefore, lower in price. As shown in simplified form in FIG. 1, a typical pen plotter 10 after drawing the plot on the media 12 moves the media 12 over a support table 14 by means of a pinch roller 16 holding the media 12 against a driven drum 17 to eject the completed plot into a receiving bin 18. With large plot sheets, the completed plot can wrinkle and cause problems and poor print quality when later reproduction by a diazo process, or the like, is attempted. Attempting to roll the randomly-folded plot onto a old media roller for safe-keeping is a time-consuming and often frustrating process.

In more complex and costly devices such as electrostatic printers and plotters, a media rolling apparatus is sometimes included as part thereof. Such prior art attempts are large and expensive and, typically, incorporate a lot of surface area over which the moving media must be moved again the friction imposed thereby. Overcoming the frictional considerations adds to the complexity and cost of the apparatus.

Wherefore, it is an object of this invention to provide a mechanism for use in pen plotters which will simply, neatly, and automatically roll the output sheets into rolls for easy storage and handling.

It is another object of this invention to provide a mechanism for automatically rolling media output by a device such as a pen plotter with a minimum of friction on the media caused thereby.

It is still another object of this invention to provide a mechanism for automatically rolling media output by a device such as a pen plotter with a minimum of friction on the media whereby the necessary components and the cost of manufacture thereof is minimized.

Other objects and benefits of the invention will become apparent from the detailed description which follows hereinafter when taken in conjunction with the drawing figures which accompany it.

SUMMARY

The foregoing object has been attained in a pen plotter ejecting completed plots comprising sheets of a flexible media by the apparatus of the present invention for receiving the completed plots at a horizontal exit point and for rolling them and delivering them to a receiving bin located below the exit point comprising, a horizontally-disposed stationary member comprising a first input guide portion connected to a first partially-cylindrical portion, the first input guide portion being disposed adjacent the exit point behind a path followed by a leading edge of a completed plot as it is ejected from the pen plotter; a horizontally-disposed shaft disposed adjacent an edge of the first partially-cylindrical portion opposite the first input guide portion; first drive means for bi-directionally rotating the shaft; a horizontally-disposed rotating member mounted on and rotating in combination with the shaft, the rotating member comprising a second input guide portion connected to a second partially-cylindrical portion along an edge opposite an edge mounted on the shaft, the rotating member being rotatable between a closed position with the first partially-cylindrical portion and the second partially-cylindrical portion in combination forming a cylindrical rolling chamber and the first input guide portion and the second input guide portion in combination forming a guide slot into the cylindrical rolling chamber and an open position with the second partially-cylindrical portion and the second input guide portion opened towards the receiving bin; drive roller means disposed through horizontal slot means in the first input guide portion and in contact with completed plots in the guide slot when the rotating member is in the closed position for contacting and moving individual ones of the completed plots through the guide slot into the cylindrical rolling chamber; second drive means for rotating the drive roller means; sensor means for providing signals when a leading edge of sheets of a completed plot are adjacent thereto; free-wheeling roller means carried by the second input guide portion to be disposed opposite the drive roller means when the rotating member is in the closed position for holding a completed plot against the drive roller means; and, logic means connected to the first drive means, the second drive means, and the sensor means for activating the first drive means and the second drive means to feed received completed plots through the guide slot into the cylindrical rolling chamber and for thereafter ejecting rolled completed plots to the receiving bin.

In the preferred embodiment, the logic means includes logic for performing the steps of:

activating the first drive means to rotate the rotating member to the open position;

activating the first drive means to rotate the rotating member to the closed position upon receiving a signal from the sensor means that the leading edge of a completed plot is adjacent thereto;

activating the second drive means to rotate the drive roller means to move a completed plot through the guide slot into the cylindrical rolling chamber; and, deactivating the second drive means and activating the first drive means to rotate the rotating member to the open position upon determining that a trailing edge of a completed plot is adjacent thereto whereby rolled completed plots from the cylindrical rolling chamber are ejected to the receiving bin.

Also in the preferred embodiment, the first input guide portion, the first partially-cylindrical portion, the second input guide portion, and the second partially-cylindrical portion are all comprised of thin slats whereby the completed plots are moved between minimal frictional contact areas.

DESCRIPTION OF THE DRAWINGS

FIG. 1 is a simplified drawing of a prior art approach to handling completed plots from a pen plotter.

FIG. 2 is a simplified side view drawing of a plot rolling mechanism according to the present invention in its open position.

FIG. 3 is a simplified side view drawing of a plot rolling mechanism according to the present invention in its closed position in the process of rolling a plot.

FIG. 4 is a simplified side view drawing of a plot rolling mechanism according to the present invention again shown in its open position and releasing a rolled plot.

DESCRIPTION OF THE PREFERRED EMBODIMENT

Figure 5:
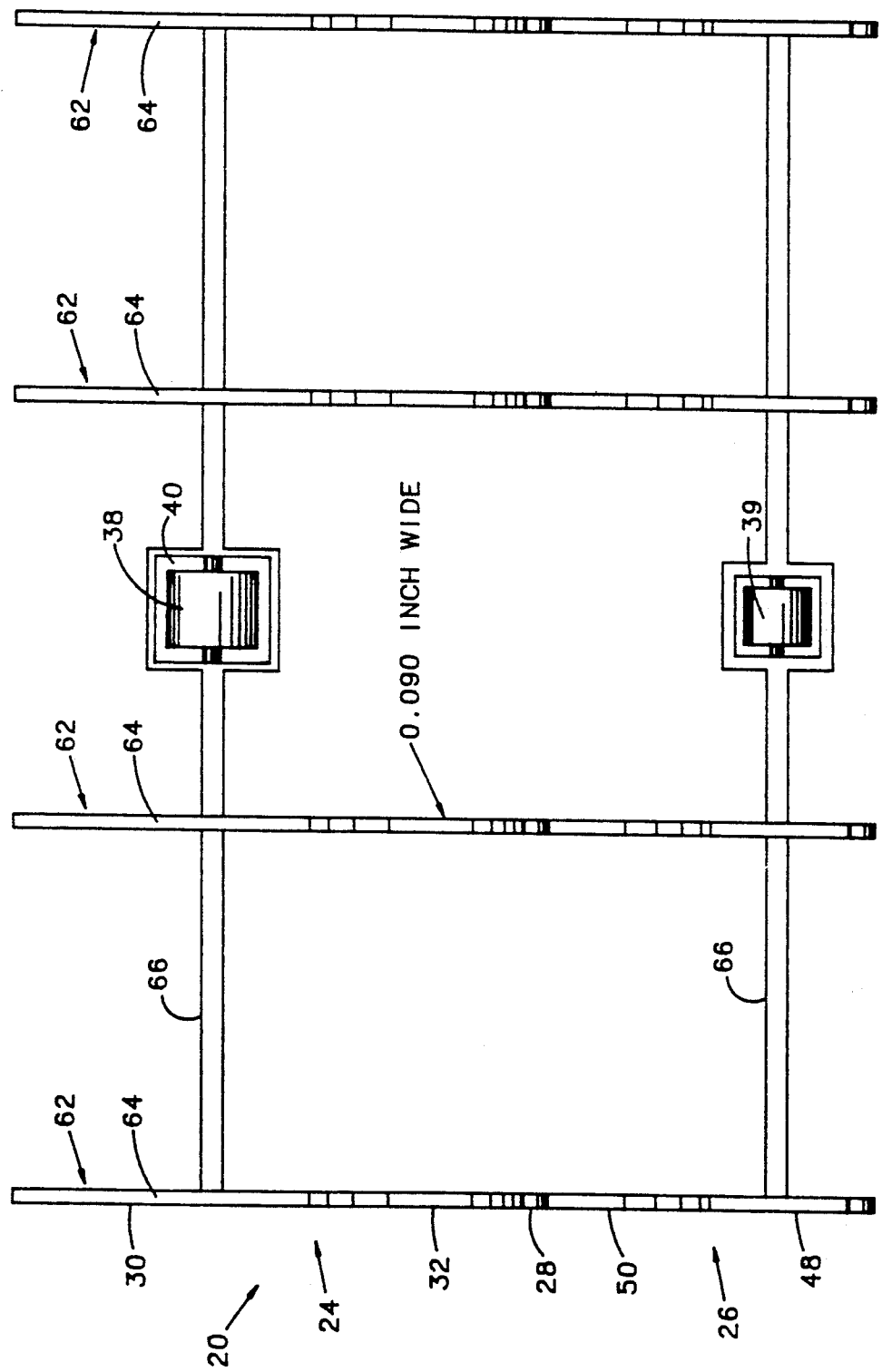
FIG. 5 is a simplified front view drawing of a plot rolling mechanism according to the present invention.

The present invention and its manner of construction and operation is shown in FIGS. 2 through 4. The rolling mechanism 20 of this invention is intended to be mounted between the ejection point 22 and the receiving bin 18 in a pen plotter 10 such as that depicted in simplified form in FIG. 1. The exact placement and the specific shape of the components will, of course, be a function of the pen plotter 10 into which the rolling mechanism 20 is incorporated. Such minor modifications will be readily apparent to those skilled in the art without experimentation and, therefore, in the interest of simplicity and the avoidance of redundancy there will be no attempt herein to address the specifics of such modifications.

Starting with the mechanism 20 in its open position as depicted in FIG. 2, there is a stationary portion 24 and a rotating portion 26 which is mounted on and rotates in combination with the shaft 28. The stationary portion 24 comprises a first input guide portion 30 connected to a first partially-cylindrical portion 32. Thus, as the media 12 moves along its exit path 36, it moves over the input guide portion 30 as depicted in FIG. 2. As depicted in FIG. 5, a single, horizontal, cylindrical drive roller 38 is disposed behind the input guide portion 30 in the center thereof and extending through a slot 40 provided in the supporting structure of the first input guide portion 30 for the purpose. Because of the low friction environment of this invention, one drive roller 38 in the center is sufficient and preferred, but several across the width of the media could be employed if desired. A media-presence sensor 42 is provided for sensing the presence of a leading edge of the media 12 at the location of the drive roller 38. The sensor 42 can be of any convenient type known to those skilled in the art for such purposes (mechanical or electrical) and simply provides a signal on its output line 44 to the control logic 46 when there is media 12 positioned below the drive rollers 38. Actually, the sensor 42 in the drawings is suggestive in nature only and its function may be accomplished through the use of components of the pen plotter itself. For example, in a tested and preferred implementation, the sensor 42 is actually a sensing of the position of the drum 17 of FIG. 1 by the logic 46 which knows the position of the media with respect to revolutions of the drum it has accomplished and, therefore, when it has employed the drum 17 to move the media 12 far enough towards the ejection point 22 to be below the drive rollers 38.

The rotating portion 26 comprises a second input guide portion 48 connected to a second partially-cylindrical portion 50. The second input guide portion 48 carries a free-wheeling roller 39 positioned to mate with the drive roller 38 with the media 12 therebetween as will be seen shortly. The two partially-cylindrical portions 32, 50 are pivotally joined at the location of the shaft 28. The shaft 28 is bi-directionally rotated by any appropriate drive mechanism 52 (motor or solenoid, with a motor being preferred) under the control of the logic 46 to rotate the rotating portion 26 between the open position of FIG. 2 and the closed position of FIG. 3.

The low friction aspects of the present invention in its preferred embodiment can best be appreciated with reference to FIG. 5. The stationary portion 24 and the rotating portion 26 are both comprised of a plurality of slats 62 having their edges 64 disposed for the media 12 to move along a very low contact area. In tested embodiments of the present invention, the contact area of the edges 64 is 0.090 inches wide. The slats are connected by cross members 66, which also carry the drive roller 38 and the free-wheeling roller 39. The relationship of the components of the mechanism 20 is most easily understood through an explanation of its manner of operation.

In operation, with the mechanism 20 in its open position of FIG. 2, the drive rollers 38 are inactivated. As the leading edge of the media 12 passes over the drive roller 38, the fact is sensed by the sensor 42 as described above, which sends a signal to the logic 46 (or is known by the logic 46 through its interaction with the sensing process). Upon the leading edge of the media 12 having entered the rolling mechanism 20 to a point below the drive rollers 38, the logic 46 activates the drive mechanism 52 to rotate the rotating portion 26 to the closed position of FIG. 3.

As can be seen in FIG. 3, in the closed position the two input guide portions 30, 48 form a guide slot 54 extending into a cylindrical rolling chamber 56 formed by the two partially-cylindrical portions 32, 50. The drive rollers 38 (which preferably have a soft, resilient outer surface) are pressed lightly against the free-wheeling rollers 39 with the media 12 therebetween. The rotating portion 26 is maintained in the closed position of FIG. 3 by the drive mechanism 52. When the rotating portion 26 is in the closed position of FIG. 3, the logic 46 then activates the drive mechanism 60 which is connected to rotate the drive rollers 38. The drive rollers 38 then gently urge the media 12 forward through the guide slot 54 into the cylindrical rolling chamber 56 where it is smoothly rolled as shown in FIG. 3. When the logic 46 recognizes that the trailing edge of the media 12 has been reached, the logic 46 stops the drive mechanism 60 and activates the drive mechanism 52 in the opposite direction to open the rotating portion 26 to the open position of FIG. 4 whereupon the smoothly and neatly rolled media 12' falls into the receiving bin 18. Again, in the preferred embodiment as tested, the position of the trailing edge of the media 12 does not have to be physically sensed as it is known to the logic 46 because the logic 46 knows how large the media 12 is in length and how much of the media 12 has been moved by the driving rollers 38.

Wherefore, having thus described the present invention, what is claimed is:

1. In a pen plotter ejecting sheets of a flexible media, apparatus for receiving the sheets at an exit point and for rolling the sheets upon ejection from the pen plotter comprising:
  a) a stationary member comprising a first input guide portion connected to a first partially-cylindrical portion, said first input guide portion being disposed adjacent the exit point behind a path followed by a leading edge of the media upon being ejected from the pen plotter;
  b) a shaft disposed perpendicular to said path adjacent an edge of said first partially-cylindrical portion opposite said first input guide portion;
  c) first drive means for bi-directionally rotating said shaft;
  d) a rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming a guide slot into said cylindrical rolling chamber and an open position with said second partially-cylindrical portion and said second input guide portion forming a ramp towards a receiving point located below the exit point;
  e) drive roller means disposed through said first input guide portion perpendicular to said path in said first input guide portion for contacting and moving the media through said guide slot into said cylindrical rolling chamber when said rotating member is in said closed position;
  f) second drive means for rotating said drive roller means;
  g) sensor means for determining when a leading edge of the media is below said drive roller mean; and,
  h) logic means,
    h1) for first activating said first drive means to rotate said rotating member to said open position,
    h2) for then activating said first drive means to rotate said rotating member to said closed position upon said leading edge of a sheet of the media being below said drive roller mean,
    h3) for then activating said second drive means to rotate said drive roller means to move said sheet of the media through said guide slot into said cylindrical rolling chamber, and
    h4) for then deactivating said second drive means and activating said first drive means to rotate said rotating member to said open position upon a trailing edge of said sheet of the media arriving at said drive roller mean whereby rolled sheets of the media from said cylindrical rolling chamber are ejected from said rolling chamber to said receiving point.

2. The media sheet rolling apparatus of claim 1 and additionally comprising:
  free-wheeling roller means carried by said second input guide portion to be disposed opposite said drive roller means when said rotating member is in said closed position for holding the media against said drive roller means.

3. The media sheet rolling apparatus of claim 1 wherein:
  said stationary portion and said rotating portion are both comprised of a plurality of slats having low contact area edges disposed for the media to move along whereby the media moves along a low friction path.

4. The media sheet rolling apparatus of claim 1 wherein:
  a) said stationary portion and said rotating portion are both comprised of a plurality of slats having low contact area edges disposed for the media to move along; and additionally comprising,
  b) a plurality of cross members connecting said plurality of slats; and,
  c) free-wheeling roller means carried by one of said plurality of cross members to be disposed opposite said drive roller means when said rotating member is in said closed position for holding the media against said drive roller means, and wherein,
  d) said drive roller means is carried by another of said plurality of cross members whereby the media moves along a low friction path.

5. The media sheet rolling apparatus of claim 1 wherein:
  said sensor means comprises means within said logic means for using rotational information about a drive drum moving the media in the pen plotter to determine when said leading edge of the media is below said drive roller means.

6. The media sheet rolling apparatus of claim 1 wherein:
  said logic means includes means for determining a position of said trailing edge as a function of a known length of the media and a distance said logic means has moved the media with said drive roller means.

7. In a pen plotter ejecting completed plots comprising sheets of a flexible media, apparatus for receiving the completed plots at a horizontal exit point and for rolling and delivering the media to a receiving bin located below the exit point comprising:
  a) a horizontally-disposed stationary member comprising a first input guide portion connected to a first partially-cylindrical portion, said first input guide portion being disposed adjacent the exit point behind a path followed by a leading edge of a completed plot upon being ejected from the pen plotter;
  b) a horizontally-disposed shaft disposed adjacent an edge of said first partially-cylindrical portion opposite said first input guide portion;
  c) first drive means for bi-directionally rotating said shaft;
  d) a horizontally-disposed rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming a guide slot into said cylindrical rolling chamber and an open position with said second partially-cylindrical portion and said second input guide portion opened towards the receiving bin;

e) drive roller means disposed through horizontal slot means in said first input guide portion for contacting and moving individual ones of the completed plots through said guide slot into said cylindrical rolling chamber when said rotating member is in said closed position;

f) second drive means for rotating said drive roller means;

g) sensor means for determining when a leading edge and a trailing edge of sheets of a completed plot are adjacent to said drive roller means; and, h) logic means connected to said first drive means, said second drive means, and said sensor means, h1) for first activating said first drive means to rotate said rotating member to said open position.

h2) for then activating said first drive means to rotate said rotating member to said closed position upon said leading edge of a completed plot being adjacent to said drive roller means.

h3) for then activating said second drive means to rotate said drive roller means to move a completed plot through said guide slot into said cylindrical rolling chamber, and h4) for then deactivating said second drive means and activating said first drive means to rotate said rotating member to said open position upon said trailing edge of a completed plot being adjacent to said drive roller means whereby rolled completed plots from said cylindrical rolling chamber are ejected to the receiving bin.

8. The rolling apparatus for a completed pen plotter plot of claim 7 and additionally comprising:

free-wheeling roller means carried by said second input guide portion to be disposed opposite said drive roller means when said rotating member is in said closed position for holding a completed plot against said drive roller means.

9. The rolling apparatus for a completed pen plotter plot of claim 7 wherein:

said stationary portion and said rotating portion are both comprised of a plurality of slats having low contact area edges disposed for a completed plot to move along whereby the completed plot moves along a low friction path.

10. The rolling apparatus for a completed pen plotter plot of claim 7 wherein:

a) said stationary portion and said rotating portion are both comprised of a plurality of slats having low contact area edges disposed for a completed plot to move along; and additionally comprising.

b) a plurality of cross members connecting said plurality of slats; and, c) free-wheeling roller means carried by one of said plurality of cross members to be disposed opposite said drive roller means when said rotating member is in said closed position for holding the completed plot against said drive roller means, and wherein.

d) said drive roller means is carried by another of said plurality of cross members whereby the completed plot moves along a low friction path.

11. The rolling apparatus for a completed pen plotter plot of claim 7 wherein:

said sensor means comprises means within said logic means for using rotational information about a drive drum moving plots in the pen plotter to determine when said leading edge of a completed plot is adjacent said drive roller means.

12. The rolling apparatus for a completed pen plotter plot of claim 7 wherein:

said logic means includes means for determining a position of said trailing edge as a function of a known length of a plot and a distance said logic means has moved a completed plot with said drive roller means.

13. In a pen plotter ejecting completed plots comprising sheets of a flexible media, a method for receiving the completed plots at a horizontal exit point and for rolling and delivering the media to a receiving bin located below the exit point comprising the steps of:

a) prior to a time of plotting, a1) positioning a horizontally-disposed stationary member comprising a first input guide portion connected to a first partially-cylindrical portion with the first input guide portion disposed adjacent the exit point behind a path followed by a leading edge of a completed plot upon being ejected from the pen plotter, a2) positioning a horizontally-disposed rotating member comprising a second input guide portion connected to a second partially-cylindrical portion for rotation about a pivot line along an edge opposite the second partially-cylindrical portion and adjacent an edge of the first partially-cylindrical portion opposite the first input guide portion so that the rotating member is rotatable between a closed position with the first partially-cylindrical portion and the second partially-cylindrical portion in combination forming a cylindrical rolling chamber and the first input guide portion and the second input guide portion in combination forming a guide slot into the cylindrical rolling chamber and an open position with the second partially-cylindrical portion and the second input guide portion opened towards the receiving bin, and a3) horizontally positioning a drive roller in the first input guide portion whereby to contact and move individual ones of the completed plots through the guide slot into the cylindrical rolling chamber when the rotating member is in the closed position; and, b) at a time of plotting, b1) rotating the rotating member to the open position.

b2) continuously sensing for leading edges of completed plots.

b3) rotating the rotating member to the closed position upon determining that a leading edge of a completed plot is adjacent the drive roller, b4) rotating the drive roller to move the completed plot through the guide slot and into the cylindrical rolling chamber where it is rolled, and b5) rotating the rotating member to the open position upon determining that a trailing edge of the completed plot is adjacent to the drive roller whereby a rolled completed plot from the cylindrical rolling chamber is ejected to the receiving bin.

14. The method of claim 13 and additionally comprising the step of:

positioning a free-wheeling roller carried by said second input guide portion to be disposed opposite the drive roller when the rotating member is in the closed position to hold a completed plot against the drive roller.

15. The method of claim 13 and additionally comprising the step of:

using rotational information about a drive drum moving plots in the pen plotter to determine when the leading edge of a completed plot is adjacent the drive roller.

16. The method of claim 13 and additionally comprising the step of:

determining a position of the trailing edge as a function of rotational information about a known length of a plot and a distance a completed plot has been moved by the drive roller.

17. The method of claim 13 and additionally comprising the step of:

forming the stationary portion and the rotating portion of a plurality of slats having low contact area edges disposed for a completed plot to move along whereby the completed plot moves along a low friction path.

18. In a pen plotter ejecting completed plots comprising sheets of a flexible media, apparatus for receiving the completed plots at a horizontal exit point and for rolling and delivering the media to a receiving bin located below the exit point comprising:

a) a horizontally-disposed stationary member comprising a first input guide portion connected to a first partially-cylindrical portion, said first input guide portion being disposed adjacent the exit point behind a path followed by a leading edge of a completed plot as it is ejected from the pen plotter;

b) a horizontally-disposed shaft disposed adjacent an edge of said first partially-cylindrical portion opposite said first input guide portion;

c) first drive means for bi-directionally rotating said shaft;

d) a horizontally-disposed rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming a guide slot into said cylindrical rolling chamber and an open position with said second partially-cylindrical portion and said second input guide portion opened towards the receiving bin;

e) drive roller means disposed through horizontal slot means in said first input guide portion and in contact with completed plots in said guide slot when said rotating member is in said closed position for contacting and moving individual ones of the completed plots through said guide slot into said cylindrical rolling chamber;

f) second drive means for rotating said drive roller means;

g) sensor means for providing signals when a leading edge of sheets of a completed plot are adjacent thereto;

h) free-wheeling roller means carried by said second input guide portion to be disposed opposite said drive roller means when said rotating member is in said closed position for holding a completed plot against said drive roller means; and, i) logic means connected to said first drive means, said second drive means, and said sensor means for activating said first drive means and said second drive means to feed received completed plots through said guide slot into said cylindrical rolling chamber and for thereafter ejecting rolled completed plots to the receiving bin; wherein, j) said stationary portion and said rotating portion are formed of a plurality of slats having low contact area edges disposed for completed plots to move along whereby the completed plots move along a low friction path.

19. The apparatus for a pen plotter of claim 18 wherein said logic means includes logic for performing the steps of:

a) activating said first drive means to rotate said rotating member to said open position;

b) activating said first drive means to rotate said rotating member to said closed position upon receiving a signal from said sensor means that said leading edge of a completed plot is adjacent thereto;

c) activating said second drive means to rotate said drive roller means to move a completed plot through said guide slot into said cylindrical rolling chamber; and, d) deactivating said second drive means and activating said first drive means to rotate said rotating member to said open position upon determining that a trailing edge of a completed plot is adjacent thereto whereby rolled completed plots from said cylindrical rolling chamber are ejected to the receiving bin.

* * * * *